United States Patent [19]
Jewett et al.

[11] Patent Number: 5,101,327
[45] Date of Patent: Mar. 31, 1992

[54] DIPSTICK LOCATOR

[75] Inventors: Warren R. Jewett, Cary; Charles K. Waterson, Chapel Hill; Timothy J. Burgess, Raleigh, all of N.C.; Stephen G. Hauser, Tarzana; Roger G. Ignon, Palos Verdes Estates, both of Calif.

[73] Assignee: IEP Group, Inc., Morrisville, N.C.

[21] Appl. No.: 612,324

[22] Filed: Nov. 13, 1990

Related U.S. Application Data

[63] Continuation-in-part of Ser. No. 503,282, Mar. 30, 1990, abandoned.

[51] Int. Cl.$^5$ ............................................. B60Q 1/26
[52] U.S. Cl. ................................ 362/83.3; 362/800; 362/396; 362/253; 362/120
[58] Field of Search ............... 362/61, 80, 23, 30, 362/120, 31, 32, 234, 253, 800, 806, 83.3, 109; 33/716; 15/210 B; 315/77

[56] References Cited

U.S. PATENT DOCUMENTS

| | | | |
|---|---|---|---|
| 2,743,352 | 4/1956 | Gilbert | 362/80 |
| 3,448,332 | 6/1969 | Nesbitt | 315/77 |
| 4,155,167 | 5/1979 | DeLano | 33/716 |
| 4,257,084 | 3/1981 | Reynolds | 362/31 |
| 4,819,135 | 4/1989 | Padilla | 362/396 |
| 4,947,476 | 8/1990 | Seaburg | 362/109 |

FOREIGN PATENT DOCUMENTS

| | | | |
|---|---|---|---|
| 169268 | 9/1921 | United Kingdom | 362/23 |
| 534695 | 3/1941 | United Kingdom | 40/547 |

*Primary Examiner*—Ira S. Lazarus
*Assistant Examiner*—D. M. Cox
*Attorney, Agent, or Firm*—Kane, Dalsimer, Sullivan, Kurucz, Levy, Eisele and Richard

[57] ABSTRACT

A dipstick locator device is mounted inside the engine compartment of a motor vehicle, and more particularly to the dipstick assembly. The device includes a light source which is activated at least when the hood is lifted to enable a person to locate the dipstick even under poor lighting conditions.

13 Claims, 5 Drawing Sheets

DIPSTICK LOCATOR

This application is a continuation-in-part of copending U.S. Pat. Application Ser. No. 503,282 filed Mar. 30, 1990 now abandoned.

BACKGROUND OF THE INVENTION

1. Field of Invention

This invention pertains to a device for identifying the location of the dipstick in a motor vehicle.

2. Brief Description of the Prior Art

Automobile and truck manufacturers recommend that the dipsticks in motor vehicles be checked at regular intervals, as well as at the beginning of extended trips to determine the amount and condition of the oil found in the motor vehicle oil pans. However because over the years a large variety of designs and layouts for motor vehicle engines have been generated, there is no standard location for the dipsticks. As a result, presently it is difficult to locate the dipstick under the hood of a car, especially under poor lighting conditions, at night, or in instances when a person is not familiar with a car. Although some cars are equipped with a hood light which is turned on when the hood is picked up, these lights are intended to illuminate the whole engine, and since they are generally relatively small they do not provide enough light to assist in the location of the dipstick.

The U.S. Pat. No. 2,743,352 to Gilbert describes an early attempt to solve, at least partially, the above-described problem. Gilbert describes an ordinary incandescent lamp, mounted on but offset from the dipstick holding tube. A switch energizes the lamp when the dipstick is removed. Although this arrangement may facilitate the return of the dipstick to its holding tube, it does not assist one to locate and remove the dipstick under poor light conditions. A similar arrangement, suffering the same disadvantages, is described in the U.S. Pat. No. 4,155,167 to DeLano.

Rose (U.S. Pat. No. 3,098,254) also recognized the above-described problems of the prior art and proposed a device which also partially solved the problems. In order to facilitate initial location of the dipstick and its holder tube, Rose telescopes over the end of the holder tube a wiping device fabricated from a phosphorescent material. The device thereby functions as a marker to locate the holding tube. Unfortunately, use of the Rose device requires modification of the assembly or the dipstick to compensate for the added length of the dipstick tube holder. Also, as the wiper device requires periodic replacement, there occurs a problem of disposal for the potentially hazardous phosphorescent materials.

In addition, the prior art devices are generally difficult to install in the relatively small spaces afforded the dipstick in the modern automotive engine. The location of the dipstick on the modern automobile is usually inaccessible for easy mounting of locator devices. The device of U.S. Pat. No. 3,098,254 is of course easy to install even in relatively inaccessible locations, but the illumination afforded is limited to a phosphorescent "glow".

Another problem related to the installation of a dipstick illuminator is the wide variety and diversity of dipstick assemblies found in the variety of modern automobiles. The diameter of the dipstick support tube is one factor alone, in that they may range in size from about $\frac{1}{4}''$ to $\frac{3}{4}''$. Flared open ends, non-flared ends, angled ends, cap receivers and like constructions all add to the individuality o the dipstick assemblies found on modern engines. These variances all contribute to difficulty in adding an illuminator device.

The present invention is also of a universal kit for installing a dipstick illuminator on a wide variety of modern automobiles, with ease and without a need for special tools.

SUMMARY OF THE INVENTION

It is an objective of the invention to provide an identification means to pinpoint the location of a motor vehicle dipstick quickly and easily.

A further objective is to provide a luminous device which can perform its functions under low light conditions, at elevated temperatures and in an oil spill environment.

Yet another objective is to provide a device which is easily installed in relatively inaccessible areas on a motor vehicle with relative ease.

Other objectives and advantages of the invention shall become apparent from the following description of the invention.

One aspect of the invention comprises a universal kit for the conversion of an unilluminated dipstick support tube holder mounted in communication with a fluid reservoir of an internal combustion engine, said unilluminated tube having (i) a first open end adapted to receive a dipstick for measuring fluid in the reservoir;

(ii) a second end mounted in communication with said fluid reservoir; and (iii) a tube body extending between the first and second ends and defining a conduit extending from the first end to the second end, said conduit being adapted by size and configuration to receive therein the dipstick, said tube body having an inner diameter and an outer diameter;

to an illuminated dipstick support tube, said kit comprising;

(A) a plurality of split rings, fabricated from a light-transmitting, synthetic polymeric resin, each of said rings having a continuous outer wall defining the peripheral margins of the split ring, and each of said rings having an inner diameter and an outer diameter, each ring of said plurality of rings differing from others of said plurality of rings in respect to the inner diameter thereof;

(B) light-generating means adapted by size and configuration to be mounted in association with a split ring, whereby said split ring is made luminous;

(C) means for mounting one of the plurality of sp it rings together with the light-generating means, upon the first open end of the tube; and (D) container means for holding the plurality of split rings, the light generator and the means for mounting, together.

DETAILED DESCRIPTION OF THE INVENTION

Figure 1:
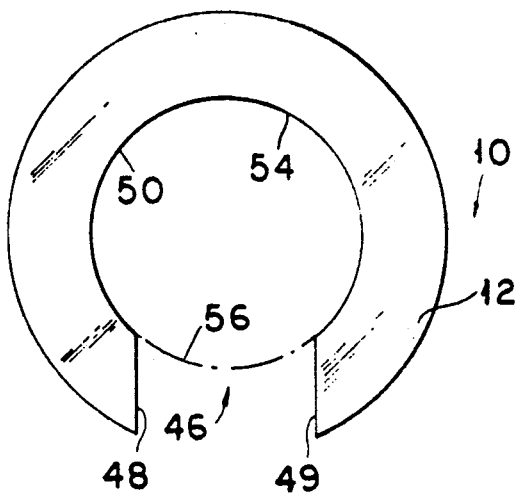
FIG. 1 shows a top view of an embodiment dipstick locating device constructed in accordance with this invention.
Figure 2:
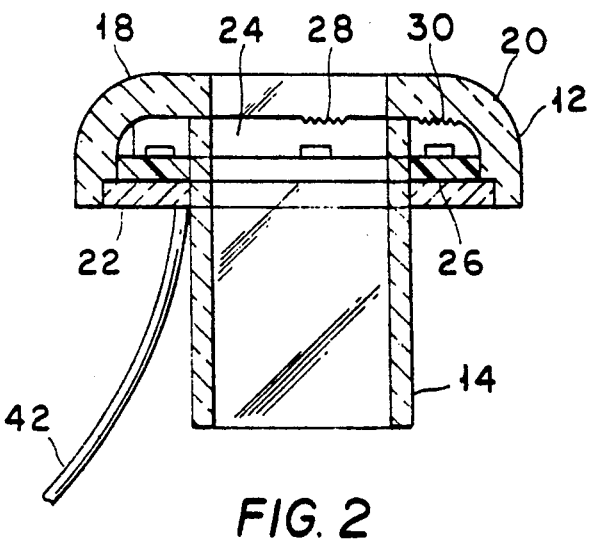
FIG. 2 shows a sectional side view of the device of FIG. 1.
Figure 3:
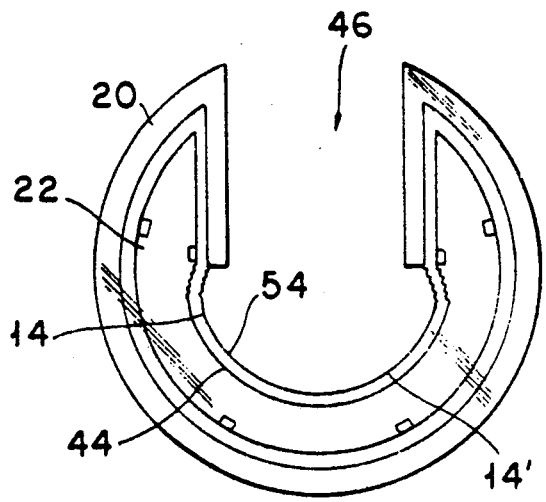
FIG. 3 shows a bottom view of the embodiment device of FIGS. 1 and 2

Referring first to FIGS. 1-4, a device 10 constructed in accordance with this invention consists of a split ring 12 and a flange projection 14 extending downwardly from, and secured to said ring 12. Projection 14 has an outer cylindrical surface 14'. Ring 12 has a generally circular top surface 18, and as shown in FIG. 2 device 10 is somewhat mushroom-shaped. The split ring 12 consists of a top housing 20, which is preferably made of a transparent or translucent polymeric resin material, and shaped like an inverted cup. The preferred synthetic polymeric resin material for fabricating the split ring 12 is light transmitting so that when exposed to relatively low level light sources, it appears luminous and illuminates adjacent areas. The resin body of the split ring 12 may be coated on surfaces thereof to selectively reflect inwardly or diffuse light, as desired. The resin material selected is advantageously resistant to degradation by contact with petroleum oils and elevated temperatures (circa 125° C.).

Representative of the synthetic polymeric resins useful to mold split rings 12 are thermoplastic polyolefins, polyurethanes, polycarbonates and poly(methylmethacrylate), particularly those which are semi-rigid and having some flexibility to facilitate installation as described hereinafter. Secured to the bottom walls of housing 20 is a cover 22 to help define an inner cavity 24. Disposed in this cavity 24, and secured to cover 22 is a printed circuit (PC) board 26. Facing cavity 24, housing 26 has an inner surface 28 which may be provided with a plurality of grooves 30 cooperating to form a Fresnel lens.

Figure 4:
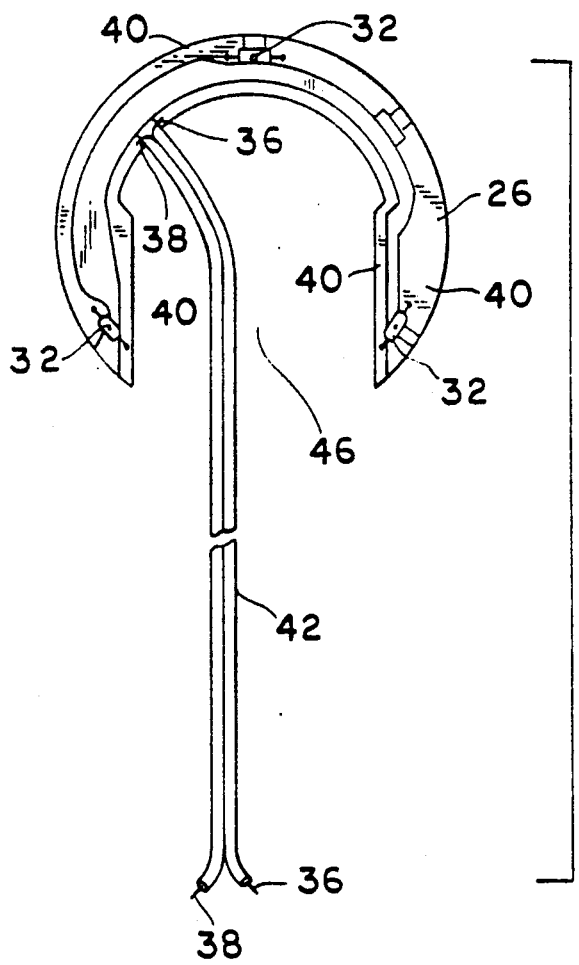
FIG. 4 shows a top view of a printed circuit board for the device of FIGS. 1-3.

As shown in more detail in FIG. 4, the PC board 26 is used to mount a plurality of light sources such as for example light emitting diodes (LED's) 32. Preferably these LED's 32 are disposed substantially equidistantly around the perimeter of board 26. The PC board 26 may also support other circuit elements which may be required to operate the light sources such as a current limiting resistor 34. The various elements on board 26, i.e. LED's 32 and resistor 34 are electrically interconnected to each other and to two external electrical leads 36, 38 by conductive strips 40 disposed on the board in conventional manner. Leads 36, 38 may be attached to form a cable 42 used to supply power to the circuits on the PC board 26.

In a preferred embodiment device of the invention, the light source may be a small incandescent bulb of the type known as an "incandescent grain of wheat".

Preferably, as shown in the Figures, the split ring 12 and integrated projection 14 are not completely circular but are formed with a slot 46 extending uniformly through the ring 12 and the projection 14. For example, as shown in FIG. 1, the slot 46 is formed between two substantially parallel walls 48, 49 and a curvilinear wall 50, which forms an inner edge 54. This shape allows the ring 12 to be flexibly opened enough to be mounted on the exterior of a dipstick support pipe 56 (shown in outline in FIG. 1) used to hold a dipstick. The outer diameter of pipe 56 may vary from one motor vehicle to another. However the device 10 can be readily mounted on a pipe 56 having any diameter up to the spacing between wall 50, as described below. After mounting, the resilient ring 12 returns to its pre-opened shape.

Figure 5:
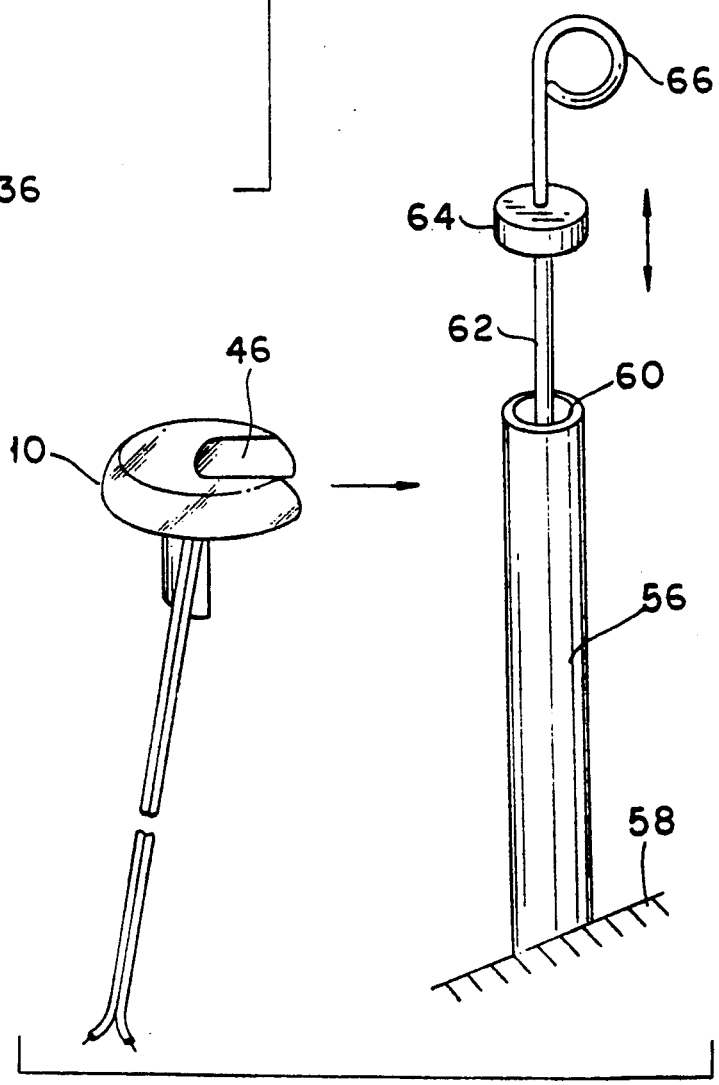
FIG. 5 shows the embodiment device just before mounting.
Figure 6:
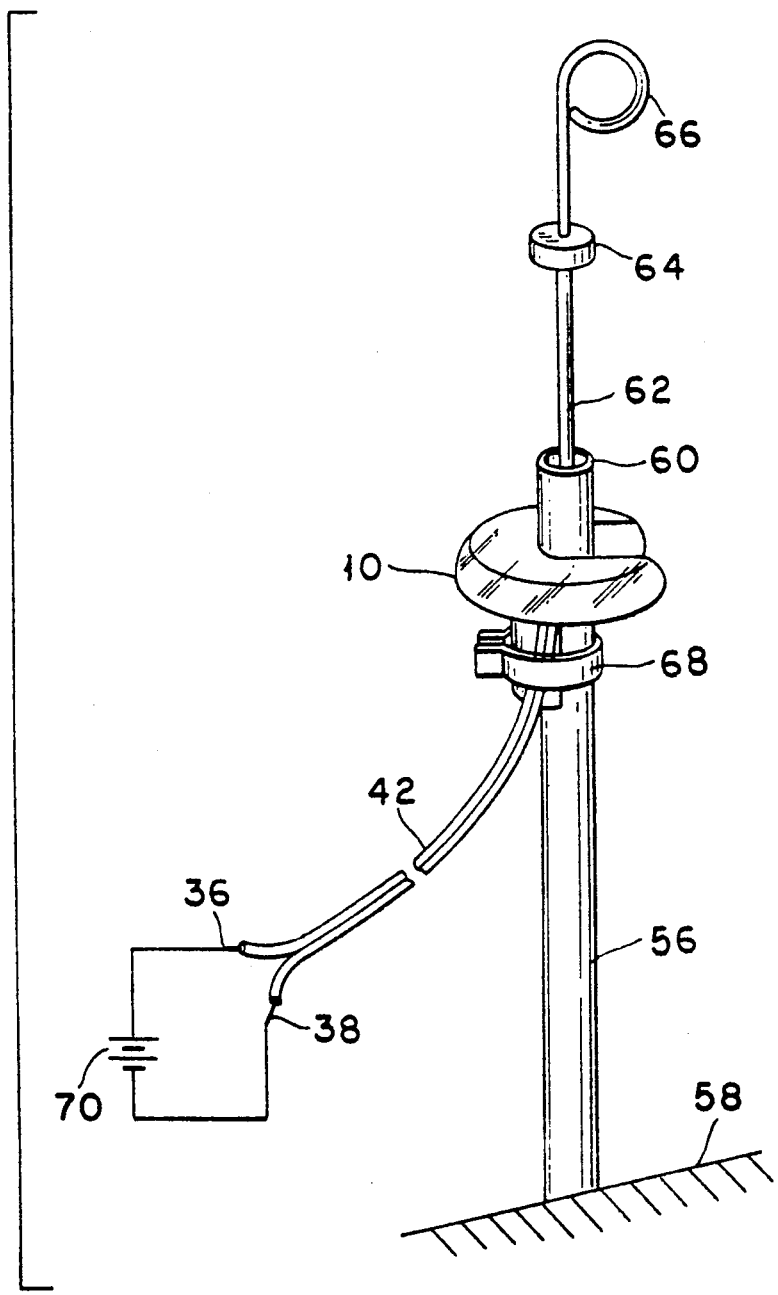
FIG. 6 shows a dipstick locating device mounted on a support pipe.

A typical installation for device 10 is shown in FIGS. 5 and 6 of the accompanying drawings. A typical pipe 56 extends upwardly from an engine block 58, and terminates in an open mouth 60. Normally a dipstick 62 is disposed within pipe 56. The dipstick 62 includes a crown 64 which fits over and covers the mouth 60. Dipstick 62 terminates in handle 66 used to telescopically insert and remove the dipstick 62 in pipe 56. As shown in the Figures, the dipstick locator device 10 is secured to the exterior of pipe 56 with the slot 46 disposed around the pipe 56. Preferably device 10 is installed close to mouth 60 but at a sufficient distance below so that it does not interfere with crown 64. Once the device 10 is positioned on pipe 56, it is secured thereto by any well known means, for example by securing a plastic or metal clamp 68 around cylindrical surface 14' and pipe 56.

Either before, or after the device 10 is installed on pipe 56, the leads 36, 38 of cable 42 are connected to a power source. For example, if a vehicle is equipped with a hood light, leads 36, 38 may be used to connect device 10 in parallel therewith, so that the device is energized every time the hood is lifted. Alternatively, since the LED's 32 are low-power elements, the leads 36, 38 may be connected directly to the motor vehicle battery 70 (see FIG. 6). In this latter instance the light sources are on continuously since their power consumption is negligible. In either case, when a person lifts the engine compartment hood he will be able to locate the dipstick by the distinctive light pattern generated by the luminous device 10. The light is generated even with the dipstick 62 secured in the open end of the pipe 56. The effect of the light generated by the LED's 32 within the device 10 is enhanced by the optional Fresnel lens formed by grooves 30 in split ring 12, which also increase the visibility angle of the device.

Figure 7:
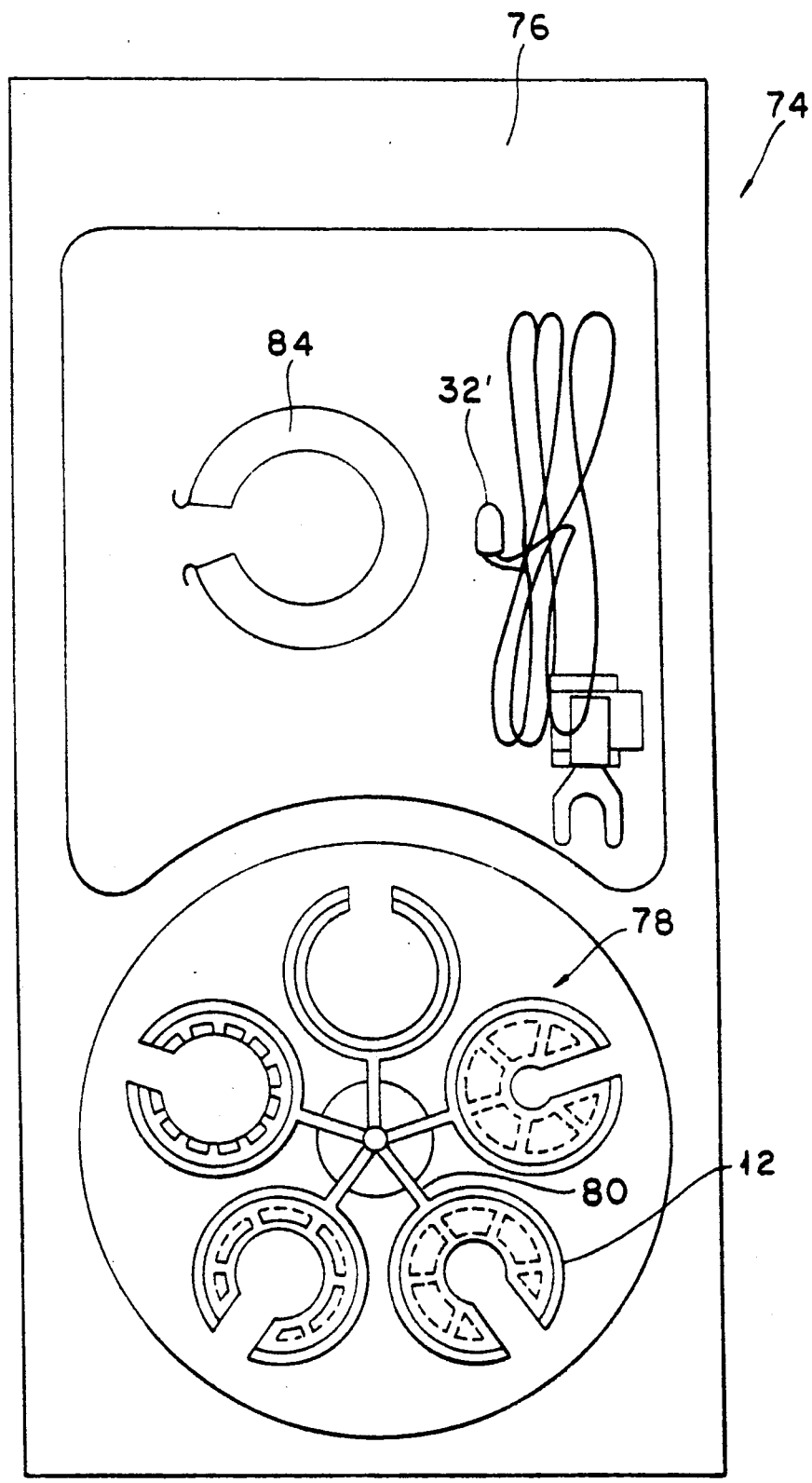
FIG. 7 depicts a universal kit of the invention for converting an unilluminated dipstick support tube to an illuminated structure.
Figure 8:
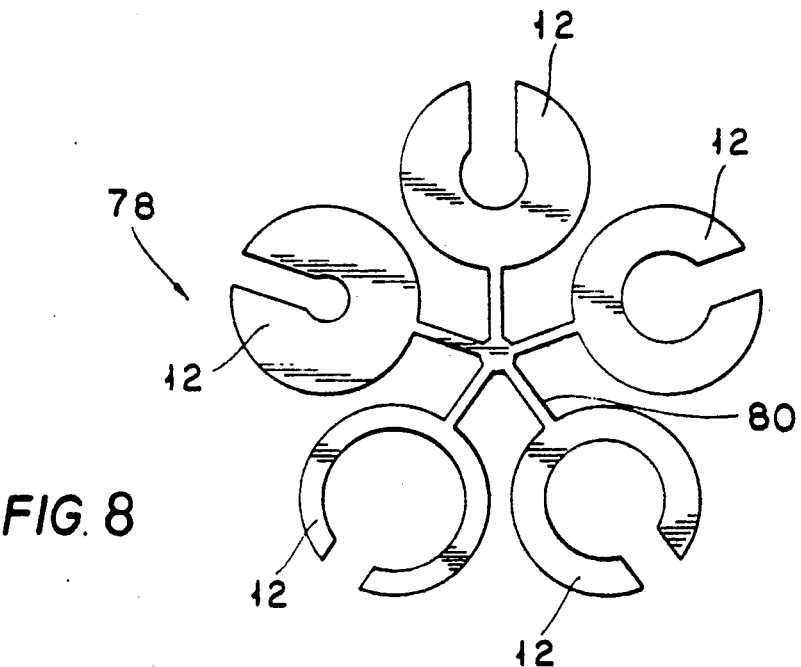
FIG. 8 is an enlarged view of the plurality of split-ring illuminating devices shown contained in FIG. 7.

Referring now to FIG. 7, there is seen a universal kit 74 of the invention, which contains in a single box container 76, a plurality of split rings 78. The container 76 is advantageously a "blister pack" container. The plurality of split rings 78 may be made up of single rings 12 as described previously, all interconnected by a molding sprue 80. In a preferred embodiment of the invention, the plurality of rings 78 are molded together simultaneously in a single mold to facilitate fabrication. As described earlier, each of the split rings differs from others in the plurality, in respect to inner diameter. This is illustrated in FIG. 8, an enlarged top view of the plurality of split-rings 78.

As mentioned previously, there is a wide variety of dipstick support tubes, found in the variety of internal combustion engines in use today. The outer diameters of these tubes may range, for example, in size from ¼ inch to ¾ inch. The split rings 12 provided in the plurality of rings 78 may be equally varied in respect to inner diameters. When using the kit 74, the installer of the illuminating device selects an appropriately sized split ring 12 from the plurality of rings 78 and separates it from the remainder by severing it from the mold sprue 82.

The kit 74 also includes as a means of mounting a single split-ring 12, a spring collar 84 and an LED lamp 32' with appropriate circuit means for connection to a power source as described previously. An exploded view of the assembly of split-ring 12, spring collar 84 and LED 32' is shown in the FIG. 9. This assembly is readily mounted on the dipstick supporting tube of an internal combustion engine. The collar 84 secures the split-ring 12 to the pipe 56 by bias spring action, which tends to close the slot 46 in the ring 12. The LED 32' is inserted under the collar 84 or the split ring 12 so as to emit light into the transparent, light-transmitting material of ring 12, thereby making it luminous when the LED is energized.

Those skilled in the art will appreciate that many modifications may be made to the above described preferred embodiments of the invention without departing from the spirit and the scope of the invention.

For example, instructions for the installation of devices of the invention may be included in the universal kit 74 of the invention, or may be printed on the blister container 76.

Also, the means for securing the split rings 12 to the dipstick support pipes may employ a wide variety of securing means, in addition to the spring acting clamp 84. Thus, in place of a spring acting clamp 84, one may use a threaded bolt and nut assembly, a ratchet type of catch, a latching mechanism, or a simple detente. In fact, by selection of a semi-flexible, polymeric resin material to mold the split ring, one can employ a resilient, undersized split ring which when mounted on the dipstick support tube will be resiliently biased towards closure of the split in the ring, thereby sufficiently securing the split ring 12 to the support pipe through frictional engagement and spring-like tendency of the split ring to close. In this instance, a separate and non-integrated means can be eliminated from the assemblies of the invention.

Alternatively, a split ring 12 can be molded to include in its structure means for securing the split ring in a slot 46 closure. For example, the ends 48, 49 can include an integrally molded ratchet means whereby when the ends 48, 49 are pressed together they engage each other through ratchet means to latch and lock the split ring in a closedly locked position. This particular construction also eliminates the need for a separate, non-integrated means of mounting the split ring 12 to a dipstick support tube.

Figure 9:
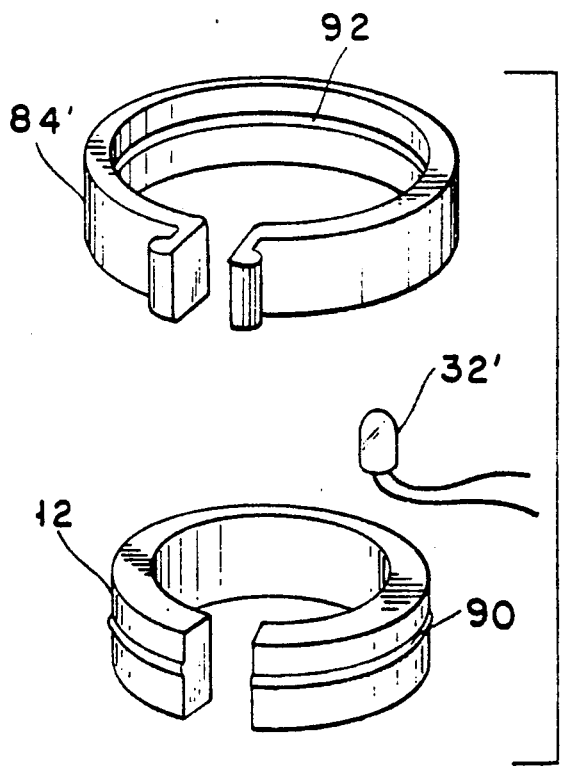
FIG. 9 is an exploded view of one of the split-rings shown in FIGS. 7 and 8, together with the light-generating and mounting means for assembly.

The split ring 12 shown in FIG. 9 may also include an integrally molded rib 90 on the outer circumference of the split ring 12, which functions in concert with the collar 84 shown, having a groove 92 on the inner aspect thereof. This rib 90 locks in groove 92 upon assembly of the collar with the split ring 12. This means allows for a securing of the collar and the split ring 12, preventing vertical movement relative to the two components.

The split ring 12 may also be pre-assembled with the LED 32' or other light source, by molding it with a concavity to receive the other light source internally. The LED 32' may therefore be cemented in the concavity (not shown in FIG. 9) with, for example, a transparent epoxy adhesive. This is advantageous in that it protects the light source from spilled oil and environmental heat and the epoxy acts as an optical coupler, allowing light to pass from the bulb directly into the molded split ring.

These alternative constructions are shown by way of example to illustrate variations which do not depart from the spirit and scope of the invention, described hereinafter in the claims.

What is claimed is:

1. A dipstick locator device for indicating the location of an oil dipstick in a motor vehicle, said dipstick being mounted in a support pipe extending from the engine block, said device comprising:
   a split ring;
   light source means supported by said ring;
   electrical circuit means for energizing the light source when the dipstick is secured and mounted in said support pipe; and
   mounting means for mounting said ring on said pipe.

2. The device of claim 1 wherein said light source means includes light emitting diodes.

3. The device of claim 1 wherein said electrical circuit means includes power cable means for connecting said light source means to an external power source.

4. The device of claim 3 wherein said external power source is a motor vehicle battery.

5. A dipstick locator device for indicating the location of an oil pipe housing a dipstick in a motor vehicle, said device comprising:
   a split ring having an enlarged top surface;
   a projection secured to and extending away from said ring, said projection having contiguous notch means arranged and constructed to surround said pipe, said notch means being provided for mounting said ring and projection on said pipe; and light source means supported by said ring; and
   electrical circuit means for energizing the light source means while the dipstick is housed in said oil pipe.

6. A dipstick locator device for indicating the location of an oil pipe housing a dipstick in a motor vehicle, said device comprising:
   a split ring having an enlarged translucent top surface; and
   a projection secured to and extending away from said ring, said cap and said projection having contiguous notch means arranged and constructed for mounting said ring and projection on said pipe; and light source means embedded in said ring.

7. A dipstick locator device for indicating the location of an oil pipe housing a dipstick in a motor vehicle, said device comprising:
   a split ring having an enlarged top surface and consisting of a translucent housing;
   a projection secured to and extending away from said ring, said projection having contiguous notch means arranged and constructed to surround said pipe, said notch means being provided for mounting said ring and projection on said pipe; and light source means is disposed under said housing.

8. The device of claim 7 wherein said housing is cup shaped to form a cavity for said light source means, said ring further comprising a cover for closing said cavity.

9. The device of claim 8 wherein said light source means are disposed on a PC board.

10. The device of claim 8 wherein said housing includes a Fresnel lens for dispersing the light from said light source means.

11. The device of claim 8 wherein said light source means includes a light emitting diode.

12. The device of claim 5 further including securing means for securing said ring and said projection to said pipe.

13. A universal kit for the conversion of an unilluminated dipstick support tube holder mounted in communication with a fluid reservoir of an internal combustion engine, said unilluminated tube having
   (i) a first open end adapted to receive a dipstick for measuring fluid in the reservoir;
   (ii) a second end mounted in communication with said fluid reservoir; and
   (iii) a tube body extending between the first and second ends and defining a conduit extending from the first end to the second end, said conduit being adapted by size and configuration to receive therein the dipstick, said tube body having an inner diameter and an outer diameter;

to an illuminated dipstick support tube, said kit comprising;
   (A) a plurality of split rings, fabricated from a light-transmitting, synthetic polymeric resin, each of said rings having a continuous outer wall defining the peripheral margins of the split ring, and each of said rings having an inner diameter and an outer diameter, each ring of said plurality of rings differing from others of said plurality of rings in respect to the inner diameter thereof;
   (B) light-generating means adapted by size and configuration to be mounted in association with a split ring, whereby said split ring is made luminous;
   (C) means for mounting one of the plurality of split rings together with the light-generating means, upon the first open end of the tube; and
   (D) container means for holding the plurality of split rings, the light generator and the means for mounting, together.

* * * * *